US011168789B2

(12) United States Patent
Myers (10) Patent No.: US 11,168,789 B2
(45) Date of Patent: Nov. 9, 2021

(54) HIGH-VOLUME DIAPHRAGM SECUREMENT APPARATUS

(71) Applicant: Douglas D. Myers, Jacksonville, FL (US)

(72) Inventor: Douglas D. Myers, Jacksonville, FL (US)

( * ) Notice: Subject to any disclaimer, the term of this patent is extended or adjusted under 35 U.S.C. 154(b) by 0 days.

(21) Appl. No.: 16/842,411

(22) Filed: Apr. 7, 2020

(65) Prior Publication Data

US 2021/0310474 A1    Oct. 7, 2021

(51) Int. Cl.
*F16J 3/02* (2006.01)
(52) U.S. Cl.
CPC ...................................... *F16J 3/02* (2013.01)
(58) Field of Classification Search
CPC .................................. F04B 43/02; F16J 3/02
See application file for complete search history.

(56) References Cited

U.S. PATENT DOCUMENTS

| 178,943 | A | | 6/1876 | Metz | |
|---|---|---|---|---|---|
| 1,771,410 | A | * | 7/1930 | Landis | F16K 7/16 137/625.27 |
| 2,157,132 | A | * | 5/1939 | Joy | F04B 43/026 417/321 |
| 3,900,276 | A | * | 8/1975 | Dilworth | F04B 11/0033 417/542 |
| 5,687,948 | A | | 11/1997 | Whiteford et al. | |
| 9,121,400 | B1 | | 7/2015 | Myers | |

* cited by examiner

*Primary Examiner* — F Daniel Lopez
(74) *Attorney, Agent, or Firm* — Law Office of Mitchell Ghaneie, P.A.; Mitchell Ghaneie; Christopher Roberts (57) ABSTRACT

This unique and novel exemplary embodiment of a high-volume diaphragm securement apparatus is related to a device for securing high-volume diaphragms that vary in size above the pressure chamber of a high-volume double diaphragm pump. The exemplary embodiment is comprised of a pair of pressure chambers, each providing an enlarged upper wall section, and a pair of corresponding geometrically adaptive retainer plates. Each retainer plate provides the ability to be customized with one or more notches such that they each can be installed on a variety of diaphragm pumps.

6 Claims, 9 Drawing Sheets

HIGH-VOLUME DIAPHRAGM SECUREMENT APPARATUS

BACKGROUND OF THE INVENTION

A. Field of the Invention

This invention relates to securing high-volume diaphragms to a double diaphragm pump such that a high-volume diaphragm is continuously seals a pressure chamber while also preventing abrasion between the high-volume diaphragm and the pressure chamber wall during use.

B. Prior Art

Diaphragms mechanically actuated by eccentrically driven pushrods, such as diaphragms used in high-volume double diaphragm pumps, have traditionally been comprised of a frustum shape that includes a relatively small flange extending from a rim around the circumference of the high-volume diaphragm's opening. However, recently the size of the high-volume diaphragm has been enlarged to increase the capacity of the pump by increasing the height and diameter of the high-volume diaphragm as well as increasing the width of the flange extending from the rim of the high-volume diaphragm. This change in size and geometry of the diaphragm unexpectedly resulted in premature failure of the new high-volume diaphragm on existing eccentrically driven double diaphragm pumps.

Due to the modified geometry of the enlarged high-volume diaphragm, the high-volume diaphragm was subjected to additional abrasive wear resulting from rubbing against the walls of the existing pressure chamber during the down stroke of the eccentrically driven pushrod. Furthermore, the enlarged high-volume diaphragm would also come in contact with the interior surface of the retainer plate during the up stroke of the eccentrically driven pushrod. As a result of the additional abrasive stresses caused the enlarged high-volume diaphragm to prematurely fail. Consequently, existing high-volume double diaphragm pumps were not compatible with the durable high-volume diaphragm.

The exemplary embodiment described herein aim to solve this issue by providing a new and novel diaphragm securement apparatus comprising a pressure chamber with expanded chamber walls and retainer plates that secure the larger diaphragms to the pressure chamber without needing to alter the size or placement of the double diaphragm pump's pressure chamber nor the configuration of adjacent components. Thus, the present invention is capable of being retrofitted on existing high-volume diaphragm pumps while also being provided on newly manufactured pumps without requiring significant cost increases to the manufacturing process.

BRIEF SUMMARY OF THE INVENTION

An exemplary embodiment of the present invention provides a securement apparatus for a high-volume diaphragm that provides geometric improvements to enlarge the diameter of a pressure chamber at the top of a pressure chamber wall and the diameter of the retainer plate's central opening, which result in preventing premature failure of the high-volume diaphragm. These geometric improvements are accomplished without modifying the design or size of any additional components of the existing high-volume double diaphragm pump.

The pressure chamber is comprised of a smoothly curved chamber wall that extends from the bottom surface of the pressure chamber to the top of the pressure chamber. To accommodate a high-volume diaphragm, the top section of the chamber wall is reduced in thickness. Due to the reduced thickness of the top section of the chamber wall, the inside diameter of the pressure chamber is greater at the top of the wall, than at the bottom of the wall. It is also anticipated that the edge created by the reduced wall thickness of the pump chamber wall is then rounded to further reduce potential of abrasion to the diaphragm that can result from contact between the diaphragm and the pressure chamber wall.

For double diaphragm pumps which provide two pressure chambers, one chamber for each diaphragm, a top plate and bottom plate are secured to each chamber and to the frame of the pump. The top plate is provided at substantially the top of each pressure chamber and provides a first plurality of through-holes and a second plurality of through-holes.

In order to maintain a watertight seal between the diaphragm and a pressure chamber, a retainer plate, which also provides a plurality of through-holes, is provided. The retainer plate has a central opening that is substantially equal in diameter to the inside diameter provided at the top of the pressure chamber wall. Surrounding the central opening of the retainer plate, is a unique design that enables the retainer plate to maintain sufficient flexural stiffness to resist stresses induced by the actuation of the diaphragm during operation of the pump. Providing sufficient flexural stiffness of the retainer plate is accomplished by increasing the width at the midpoint between each of the retainer plate's through-holes. The unique retainer plate design allows for securing and sealing a high-volume diaphragm in place over a pressure chamber while also accommodating the adjacent components of the pump. Accordingly, the retainer plate additionally allows for providing one or more notches if necessary to accommodate said adjacent pump components.

Such a configuration for the retainer plate additionally allows for existing double diaphragm pumps to be retrofitted such that they can accommodate high-volume diaphragms through reducing the existing chamber wall's thickness at the top of the chamber wall.

REFERENCE NUMBERS

1—High-volume double-diaphragm pump
3—First outlet passage

4—Second outlet passage
5—High-volume diaphragm securement apparatus
10—First pressure chamber
11—First upper wall section
12—First lower wall section
15—Second pressure chamber
16—Second upper wall section
17—Second lower wall section
18—Bottom plate
19—Top plate
20—First retainer plate
25—Second retainer plate
28—Primary corner
29—Secondary corner
30—First plurality of retainer plate through-holes
31—Second plurality of retainer plate through-holes
32—Central opening
35—Top plate through-holes
40—Plurality of bolts
45—Plurality of nuts
50—Enlarged high-volume diaphragm
60—Outlet Chamber
61—Side Wall

REFERENCE LETTER

A—Minimum predetermined width of retainer plate

DETAILED DESCRIPTION OF THE EMBODIMENTS

An exemplary embodiment high-volume diaphragm securement apparatus 5, hereinafter referred to as "diaphragm securement apparatus" 5, is provided for a high-volume double-diaphragm pump 1, hereinafter referred to as a "pump" 1, to assist in securing an enlarged high-volume diaphragm 50, hereinafter referred to as a "diaphragm", without causing premature failure of the diaphragm 50 during use of the pump 1. This exemplary embodiment 5 is comprised of a pair of pressure chambers, one of the pair being a first pressure chamber 10 and the other being a second pressure chamber 15, a top plate 19, a bottom plate 18, and a pair of retainer plates, one of the pair being a first retainer plate 20 and the other being a second retainer plate 25.

The first pressure chamber 10 and second pressure chamber 15 are respectively comprised of a first cylindrical wall and second cylindrical wall. The first cylindrical wall and second cylindrical wall are respectively integrally attached to a first bottom surface and second bottom surface. The first bottom surface and second bottom surface are respectively located substantially at the bottom of the first cylindrical wall and bottom of the second cylindrical wall. The first and second cylindrical walls each comprise an interior and exterior surface. The first cylindrical wall and second cylindrical wall are respectively further comprised of a first upper wall section 11 and a second upper wall section 17. The first and second upper wall sections 11,16 respectively transition to a first lower wall section 12 and second lower wall section 17. The upper wall sections 11,16 each have a reduced wall thickness at the interior surface of the upper wall section that forms a vertical recess relative to the interior surface of their respective lower wall sections 12,17.

Furthermore, the vertical recesses of the upper wall sections 11,16 each have a larger inside diameter relative to the inside diameter of their respective lower wall section 12,17. The height and inside diameter of the first upper wall section 11 is substantially equal to the height and inside diameter of the second upper wall section 16. The height and inside diameter of the first lower wall section 12 is substantially equal to the height and inside diameter of the second lower wall section 17. However, it is anticipated that alternative embodiments may provide pressure chambers of unequal sizes.

Figure 3:
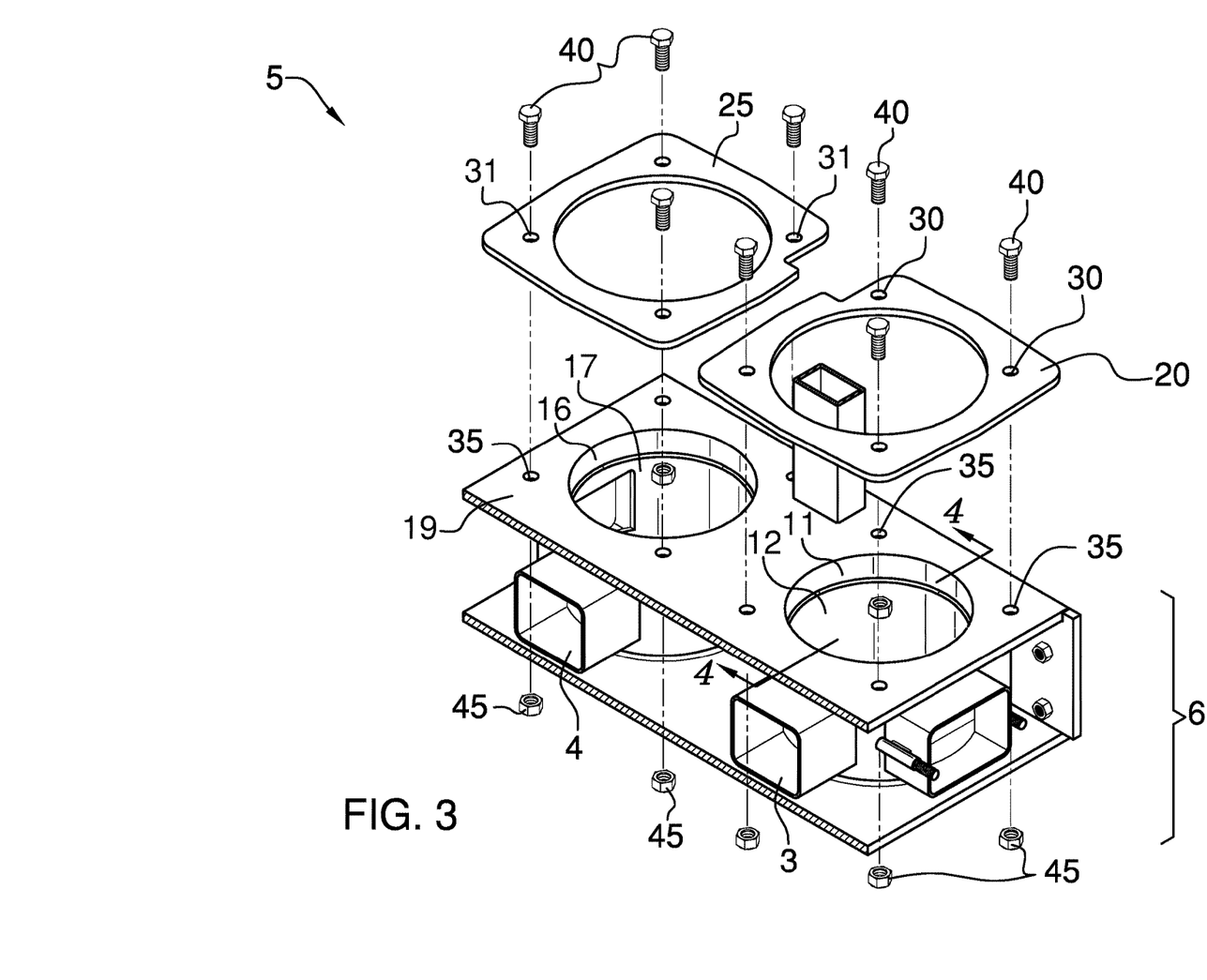
FIG. 3 is an isometric exploded view of the high-volume diaphragm securement apparatus.
Figure 4:
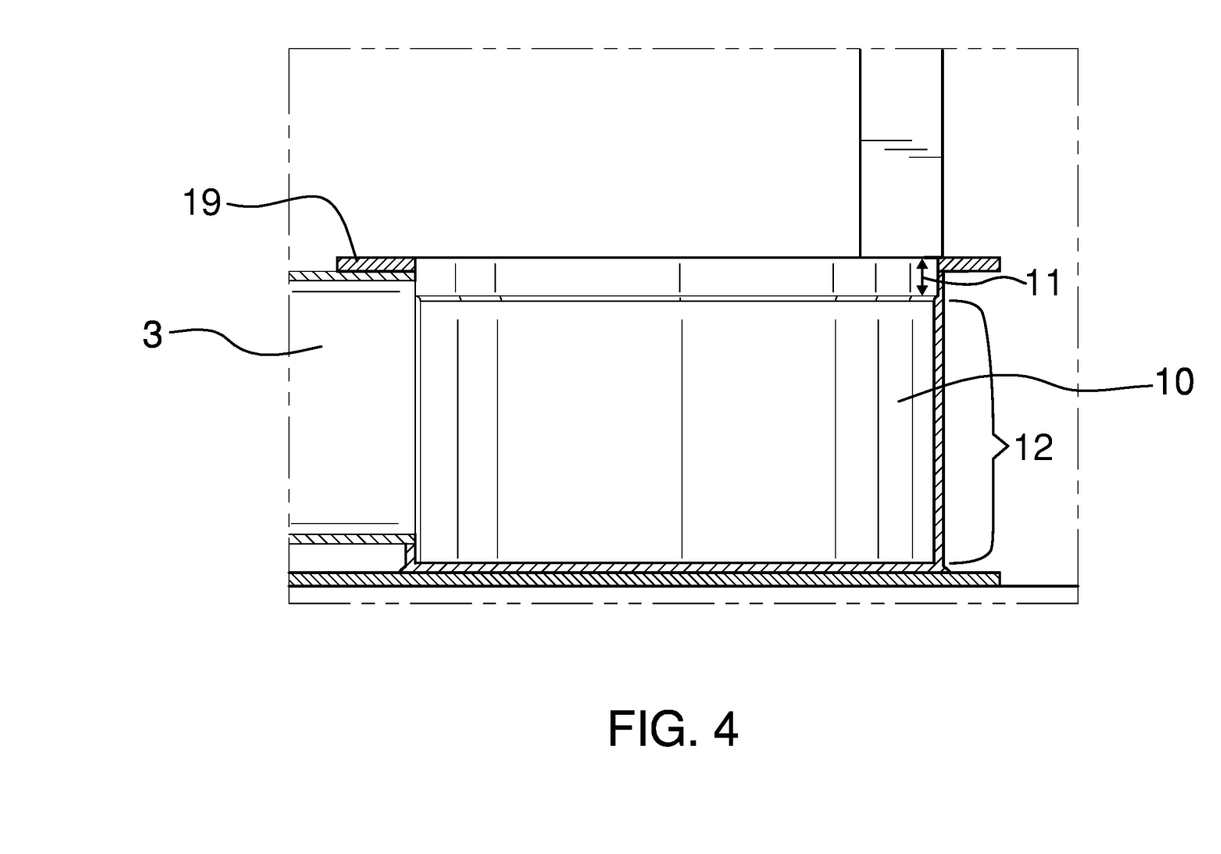
FIG. 4 is a cross-sectional view of the first pressure chamber.

The first pressure chamber 10 provides a first outlet 3 that is integrally attached to the first pressure chamber 10, as shown in FIG. 3. The second pressure chamber 15 provides a second outlet 4 that is integrally attached to the second pressure chamber 15, as shown in FIG. 3.

The upper wall sections 11,16 of each pressure chamber 10, 15, provide additional space, to prevent contact between the interior walls of each respective pressure chamber and the respective diaphragms, which are secured over the pressure chambers. Providing a larger inside diameter for the upper wall sections 11,16 of each pressure chamber 10,15, relative to the lower wall sections 12,17, also prevents eccentrically actuated diaphragms from scraping the pressure chamber wall. As a result of the mitigation of these localized abrasive stresses the service life of the diaphragm is increased.

The top plate 19 provides a first plurality of through-holes and a second plurality of through-holes, hereinafter collectively referred to as the top plate through-holes 35. A plurality of bolts 40 and a plurality of nuts 45 are provided to secure the first retainer plate 20 to the top plate 19 over the first pressure chamber 10 and the second retainer plate 25 to the top plate 19 over the second pressure chamber 15.

Figure 6:
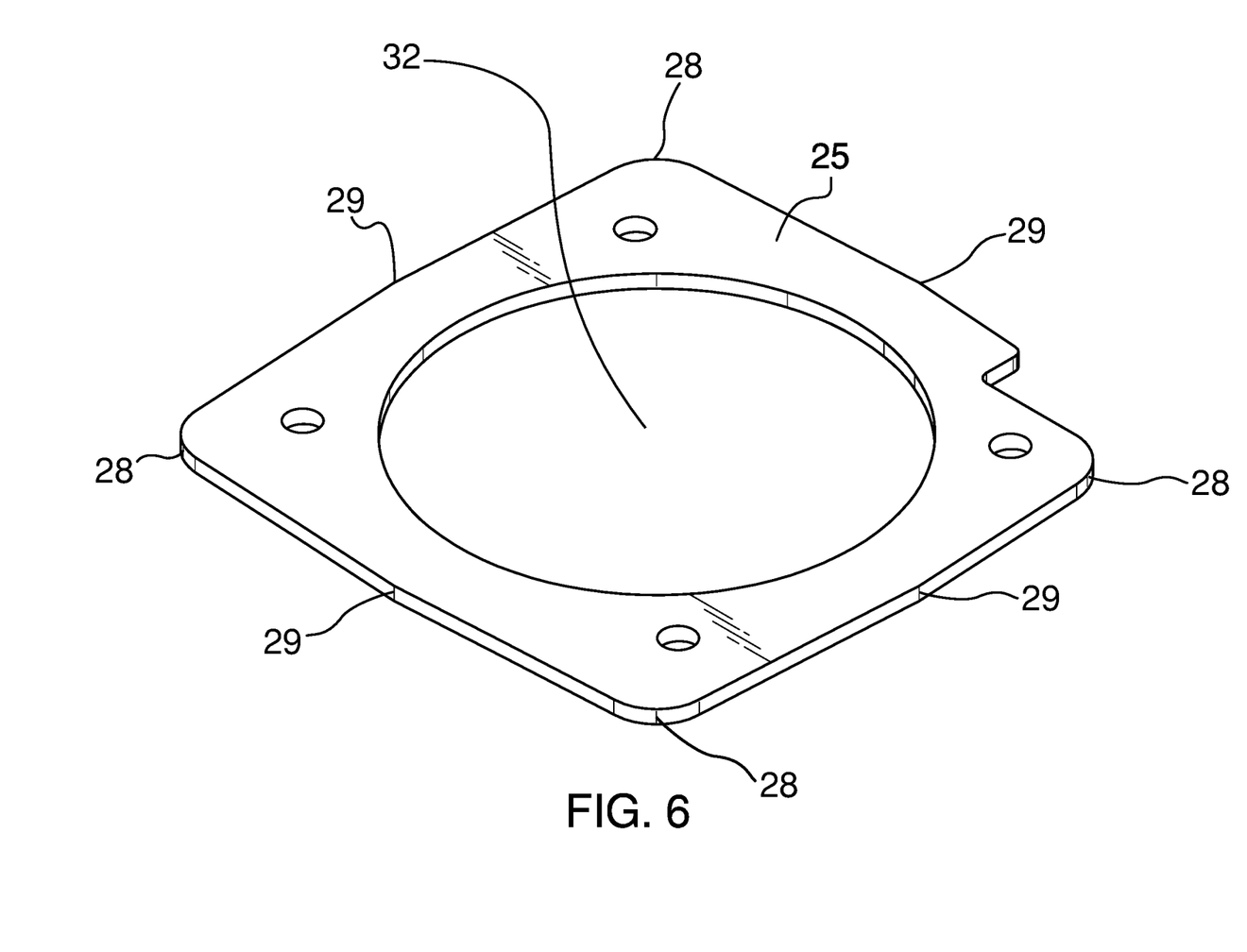
FIG. 6 is an isometric view of a retaining plate.

The pair of retainer plates 20,25 are each further comprised of a central opening, an exterior wall, a top surface and a bottom surface. Additionally, the first retainer plate 20 provides a first plurality of retainer plate through-holes 30 and the second retainer plate 25 provides a second plurality of retainer plate through-holes 31. The first plurality of retainer plate through-holes 30 substantially align with the first plurality of top plate through-holes and the second plurality of retainer plate through-holes 31 substantially align with the second plurality of top plate through-holes. The exterior wall of each retainer plate 20,25 provides a plurality of sides and each side provides a first end and a second end. The plurality of sides is integrally attached to each other to form a plurality of primary corners 28 and secondary corners 29, as shown in FIG. 6, wherein each through-hole of the plurality of retainer plate through-holes 30,31 is provided near one of the retainer plate's primary corners. The interior wall of each retainer plate 20,25 is formed by the central opening 32 of each retainer plate 20, 25. The circumference of the central opening 32 of each retainer plate 20,25 is substantially equal to the circumference of the inside diameter of the respective upper wall section 11, 17. The interior wall of each retainer plate 20,25 has vertically co-axial alignment with the respective interior surface of the upper wall section 11, 17 of the first pressure chamber 10 and the second pressure chamber 15.

Figure 7:
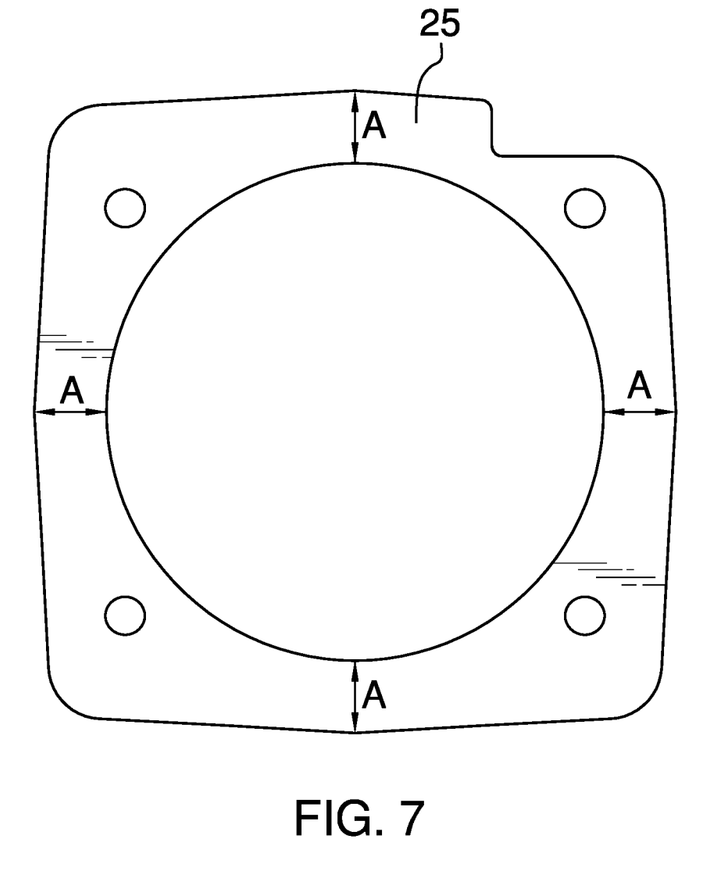
FIG. 7 is a top view of the retaining plate.
Figure 8:
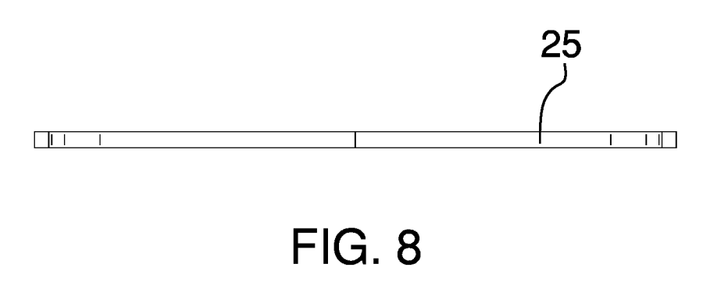
FIG. 8 is front side view of the retaining plate.
Figure 9:
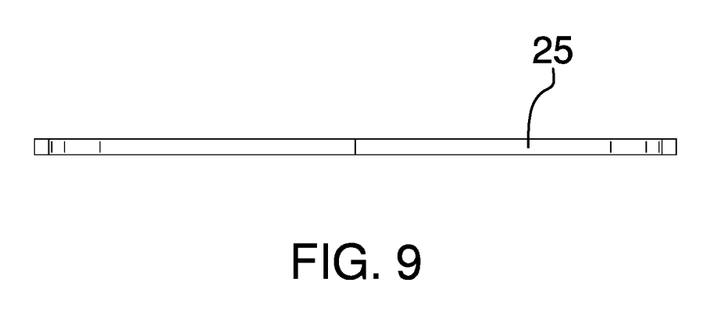
FIG. 9 is a left side view of the retaining plate.
Figure 10:
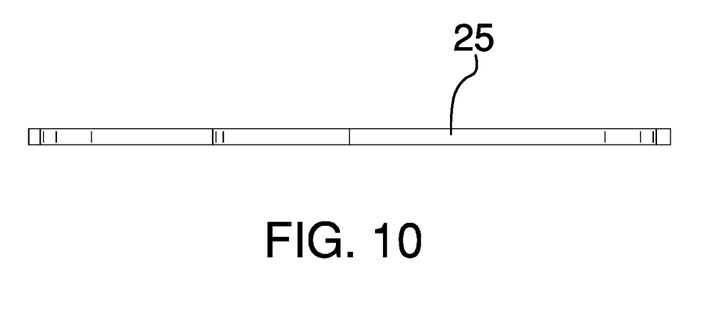
FIG. 10 is a right side view of the retaining plate.
Figure 11:
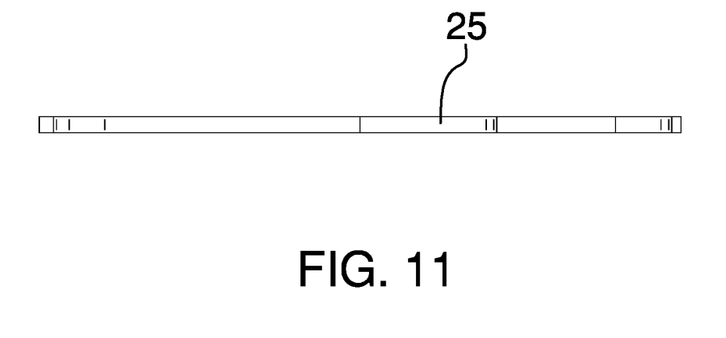
FIG. 11 is a back side view of the retaining

Each secondary corner 29 is provided by a point of intersection between the second ends of two adjacent exterior sides, as shown in FIG. 6. Furthermore, the two adjacent sides are noncollinear, as shown in FIG. 6. Each secondary corner 29 for each of the retainer plates 10,15 is positioned to be substantially collinear with the midpoint of the linear distance between two adjacent retainer plate through-holes and the center of the central opening. A minimum predetermined width A at each secondary corner 29, as shown in FIG. 7, is provided by the retainer plates 20, 25 to maintain adequate flexural stiffness to ensure the retainer plate is able to continuously seal the diaphragm over its respective pressure chamber. The minimum predetermined width A dimension is provided from the interior wall to each of the secondary corners 29, and a minimum predetermined dimension is provided from the interior wall to the center of each of the through-holes 30,31, such that the minimum predetermined width A dimension to each secondary corner is greater than the minimum predetermined dimension to the center of each of the through-holes.

Figure 1:
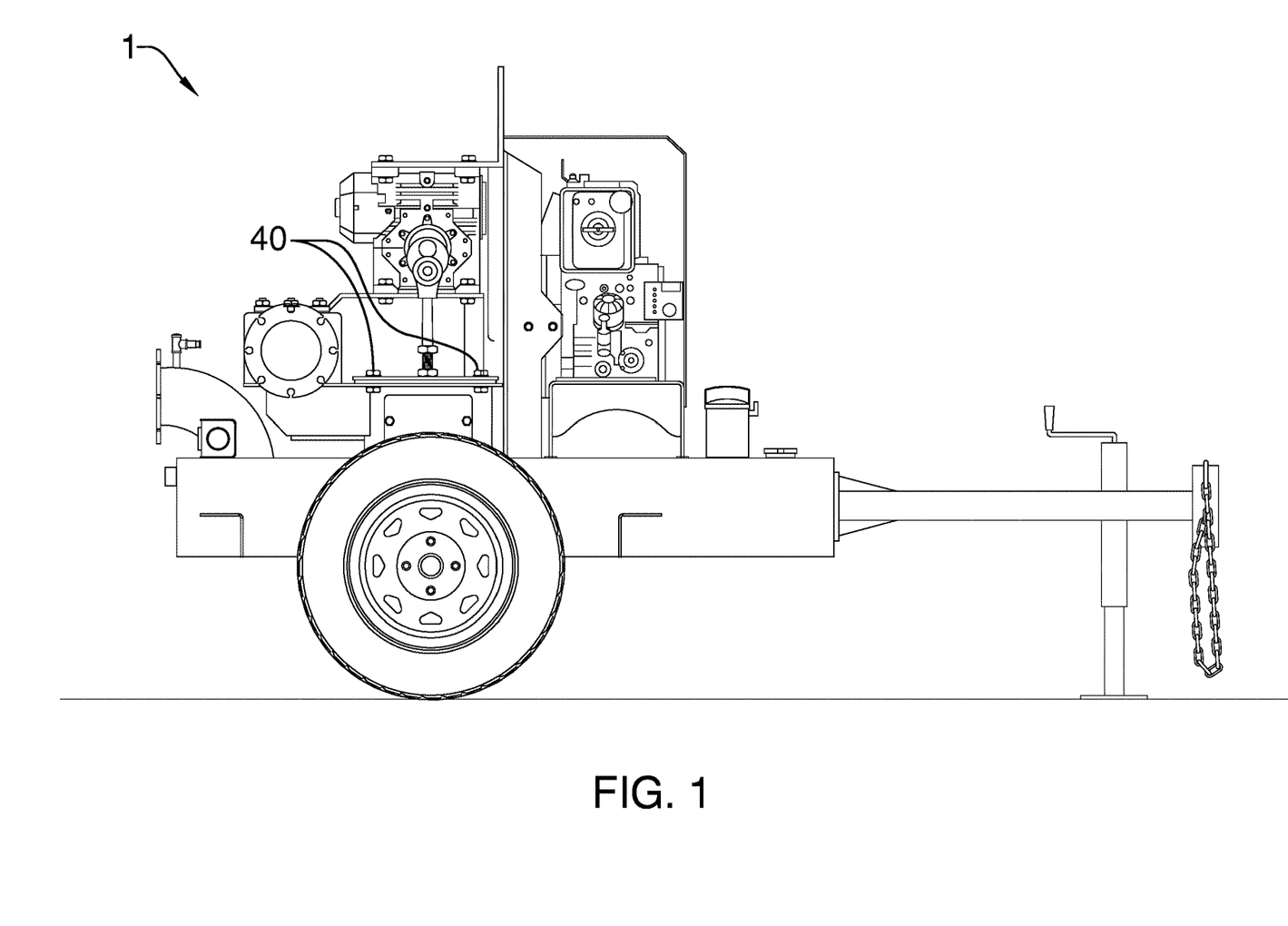
FIG. 1 is a side view of a high-volume dual-diaphragm pump.
Figure 2:
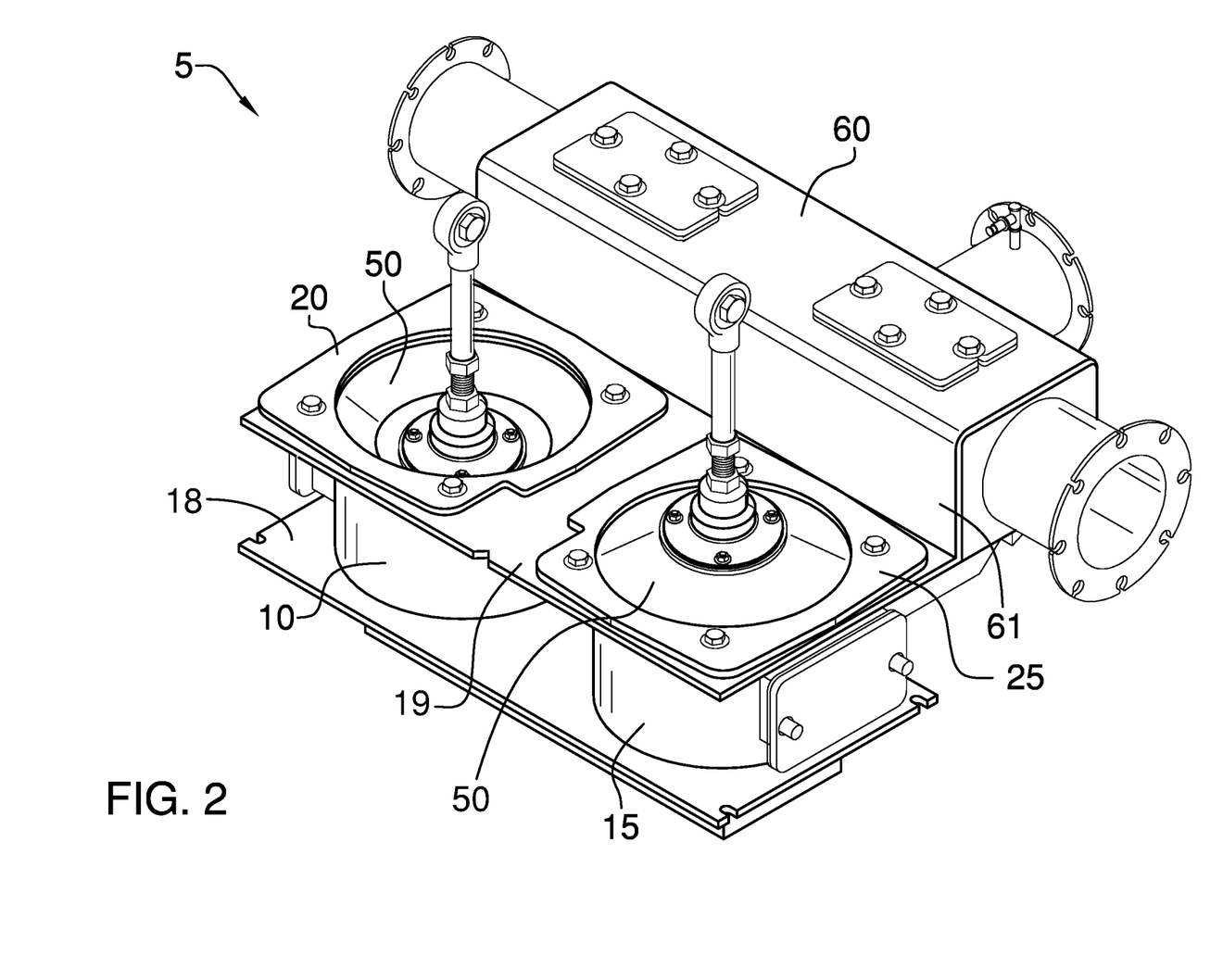
FIG. 2 is an isometric view of a high-volume diaphragm being secured the first pressure chamber and first retaining plate and a second high-volume diaphragm being secured between the second pressure chamber and second retaining plate.

Substantially adjacent to one of the secondary corners 29 is a side wall 61 of an outlet chamber 60 provided by the pump 1, as shown in FIG. 2. Such placement of the outlet chamber 60 limits the size of a potential securement apparatus for each diaphragm.

Figure 5:
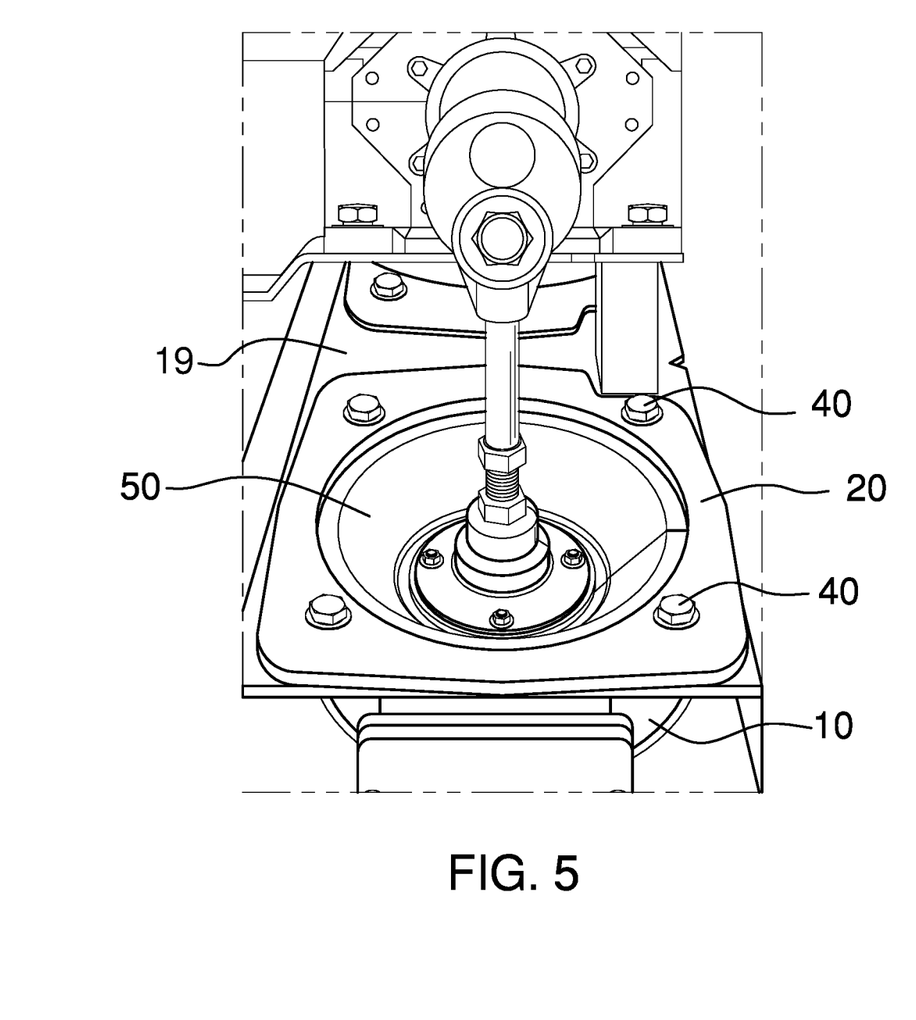
FIG. 5 is an elevated side view of the high-volume diaphragm securement apparatus.

The aspect of the retainer plates 20, 25 shown in the drawing figures shows a pump component vertical support located in between the plates (see FIG. 5) which requires clearance, and thus notches are provided in the retainer plates. However, alternative aspects of the pumps which do not have conflicting adjacent components may use symmetrical retainer plates without notches (not shown). In such alternative retainer plates, each of the retainer plates 20, 25 may provide a symmetrical eight-sided profile. However, it is anticipated that when the retainer plates 20, 25 are retrofitted on an existing double diaphragm pump, the double diaphragm pump may provide existing elements that encroach within the footprint of the retainer plates 20, 25. As such, the retainer plates 20, 25 can be customized by incorporating one or more notches between the primary corners 28 and secondary corners 29 to allow the retainer plates 20, 25 fit around other components of the pump 1, which is shown in FIG. 5. Furthermore, when one or more notches are provided by the retainer plates 20, 25 the retainer plates 20, 25 may lose their symmetry.

Accordingly, the retainer plates 20, 25 are suitable to be used with a variety of different double diaphragm pumps. Consequently, the retainer plates 20, 25 can be used with a newly manufactured double diaphragm pump or utilized as a retrofitted improvement to an already existing double diaphragm pump.

While the embodiments of the invention have been disclosed, certain modifications may be made by those skilled in the art to modify the invention without departing from the spirit of the invention.

The inventor claims:

1. A high-volume diaphragm pressure chamber and securement system, which is comprised of the following:
   a. a first pressure chamber;
      wherein the first pressure chamber is integrally formed with a first cylindrical wall and a first bottom surface;
      wherein the first bottom surface is provided substantially at the bottom of the first cylindrical wall;
      wherein the first cylindrical wall has an exterior surface and an interior surface;
      wherein the first cylindrical wall has an upper wall section and a lower wall section;
      wherein the first cylindrical wall includes a reduction in wall thickness at the interior surface of the upper wall section that forms a vertical recess relative to the interior surface of the lower wall section;
      wherein the vertical recess of the upper wall section of the first cylindrical wall has a larger inside diameter relative to the lower wall section of the first cylindrical wall;
   b. a second pressure chamber;
      wherein the second pressure chamber is integrally formed with a second cylindrical wall and a second bottom surface;
      wherein the second bottom surface is provided substantially at the bottom of the second cylindrical wall;
      wherein the second cylindrical wall has an exterior surface and an interior surface;
      wherein the second cylindrical wall is further comprised of an upper wall section and a lower wall section;
      wherein the second cylindrical wall includes a reduction in wall thickness at the interior surface of the upper wall section that forms a vertical recess relative to the interior surface of the lower wall section;
      wherein the vertical recess of the upper wall section of the second cylindrical wall has a larger inside diameter relative to the lower wall section of the second cylindrical wall;
   c. a top plate;
      wherein the top plate is attached to the exterior surface of the first cylindrical wall provided by the first pressure chamber;
      wherein the top plate is attached to the exterior surface of the second cylindrical wall provided by the second pressure chamber;
      wherein the top plate provides a first plurality of through-holes and a second plurality of through-holes;
      wherein the top plate further provides a first chamber opening and a second chamber opening;
   d. a first retainer plate;
      wherein the first retainer plate provides a central opening and a first plurality of retainer plate through-holes;
      wherein the first retainer plate comprises an interior wall, an exterior wall, a top surface, and a bottom surface;
      the interior wall of the first retainer plate being defined by the circumference of the central opening;
      the exterior wall of the first retainer plate being defined by a plurality of exterior sides;
      wherein each exterior side of the first retainer plate has a first end and a second end;
      wherein a plurality of primary corners is provided by the intersection by the first ends of each exterior side of the first retainer plate;
      wherein a plurality of secondary corners is provided;
      each secondary corner being provided by a point of intersection between the second ends of two adjacent exterior sides;
      wherein each secondary corner is substantially collinear with a midpoint of the linear distance between two adjacent retainer plate through-holes and the center of the central opening;
      wherein the central opening of the first retainer plate has substantially the same circumference as the interior surface of the upper section of the first pressure chamber;
      wherein each of the first plurality of retainer plate through-holes of the first retainer plate align with one corresponding through-hole of each of the first plurality of through-holes in the top plate;
      wherein the interior wall of the first retainer plate having vertically co-axial alignment with the interior surface of the upper wall section of the first chamber;

e. a second retainer plate;
- wherein the second retainer plate provides a central opening and a second plurality of retainer plate through-holes;
- wherein the second retainer plate comprises an interior wall, an exterior wall, a top surface, and a bottom surface;
- the interior wall of the second retainer plate being defined by the circumference of the central opening of the second pressure chamber;
- the exterior wall of the second retainer plate being defined by a plurality of exterior sides;
- wherein each exterior side of the second retainer plate has a first end and a second end;
- wherein a plurality of primary corners is provided by the intersection of the first ends of each exterior side of the second retainer plate;
- each through-hole being provided substantially in each primary corner of the second retainer plate;
- wherein the second end of each exterior side extends outwardly from each primary corner relative to the center of the central opening;
- wherein a plurality of secondary corners is provided
- each secondary corner being provided by a point of intersection between the second ends of two adjacent exterior sides;
- wherein each secondary corner is substantially collinear with a midpoint of the linear distance between two adjacent retainer plate through-holes and the center of the central opening;
- wherein the central opening of the second retainer plate has substantially the same circumference as the interior surface of the upper section of the second pressure chamber;
- wherein each of the second plurality of retainer plate through-holes of the second retainer plate align with one corresponding through-hole of each of the second plurality of through-holes in the top plate;
- wherein the interior wall of the second retainer plate having vertically co-axial alignment with the interior surface of the upper wall section of the second chamber.

2. The high-volume diaphragm pressure chamber and securement system of claim 1, wherein the first retainer plate and second retainer plate are each secured to the top plate with a plurality of nuts and bolts.

3. The high-volume diaphragm pressure chamber and securement system of claim 1, wherein the top plate and a bottom plate are attached to a frame of a diaphragm pump.

4. The high-volume diaphragm pressure chamber and securement system of claim 1, wherein at least one retainer plate provides one or more notches between a primary corner and a secondary corner.

5. The high-volume diaphragm pressure chamber and securement system of claim 1, wherein the exterior surface of the first retainer plate and the exterior surface of the second retainer plate each provide at least four primary corners and at least four secondary corners.

6. The high-volume diaphragm pressure chamber and securement system of claim 1, wherein a bottom plate provides the bottom surfaces of the first and second pressure chambers.

\* \* \* \* \*